United States Patent Office 3,010,526
Patented Nov. 28, 1961

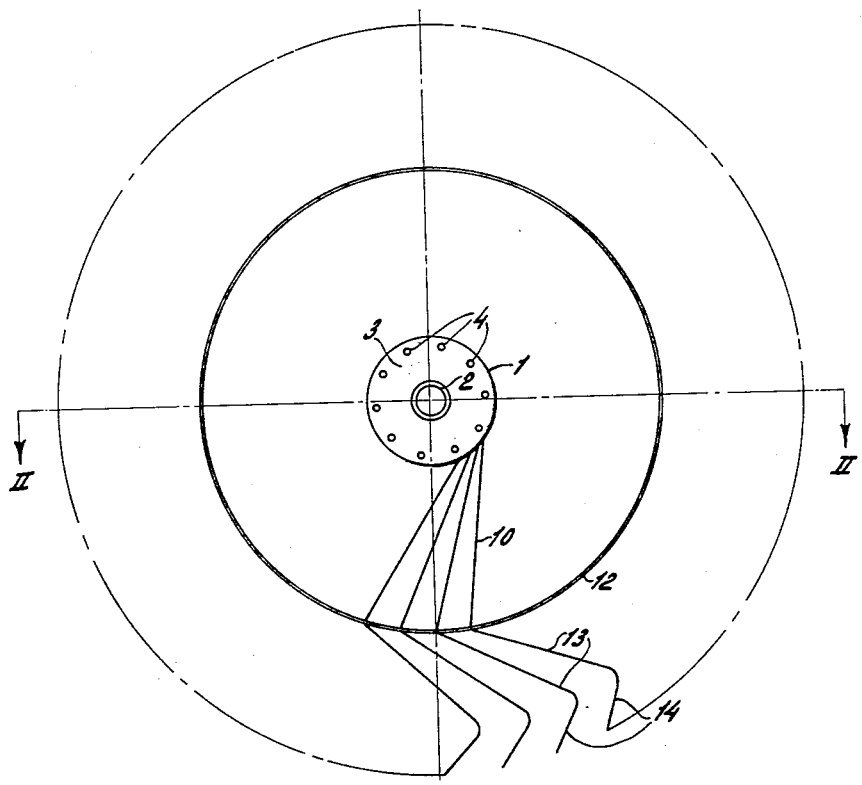
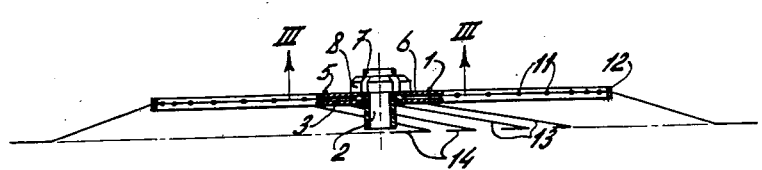

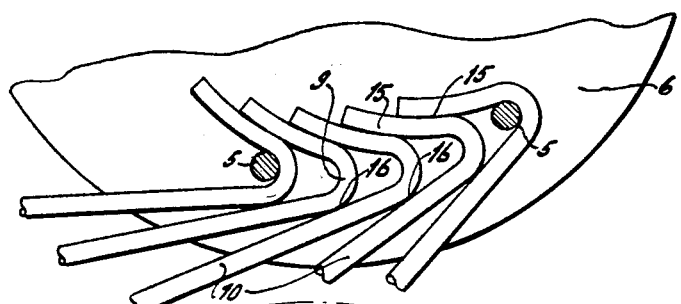
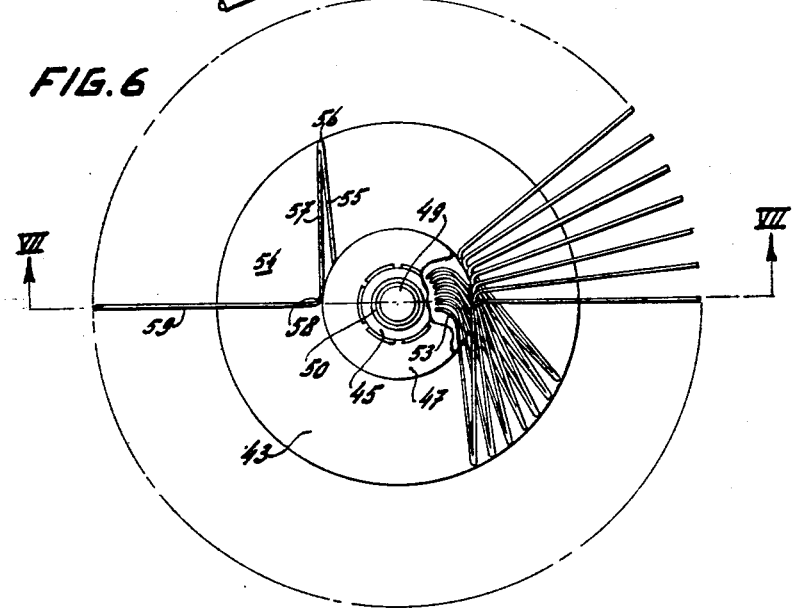
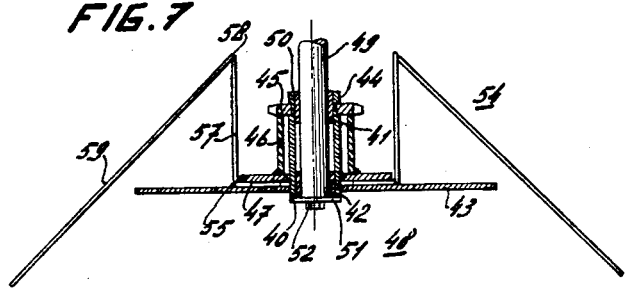

3,010,526
WHEEL PROVIDED WITH TINES OR SPOKES
Cornelis van der Lely and Ary van der Lely, Maasland, Netherlands, assignors to C. van der Lely N.V., Maasland, Netherlands, a limited liability company of the Netherlands
Filed Jan. 25, 1956, Ser. No. 561,231
Claims priority, application Netherlands Apr. 27, 1955
2 Claims. (Cl. 172—543)

This invention relates to rake or cultivator wheels of the type comprising a hub to which are attached elongated members constituting tines or spokes. Wheels of this kind are generally known.

It is an object of the present invention to provide a rake wheel or cultivator wheel in which the tines can have a very simple shape and can be readily detached. According to the invention, the hub is such that the elongated members near the hub have adjacent contacting sides, due to which said members restrict each other's movement.

Figure 4:
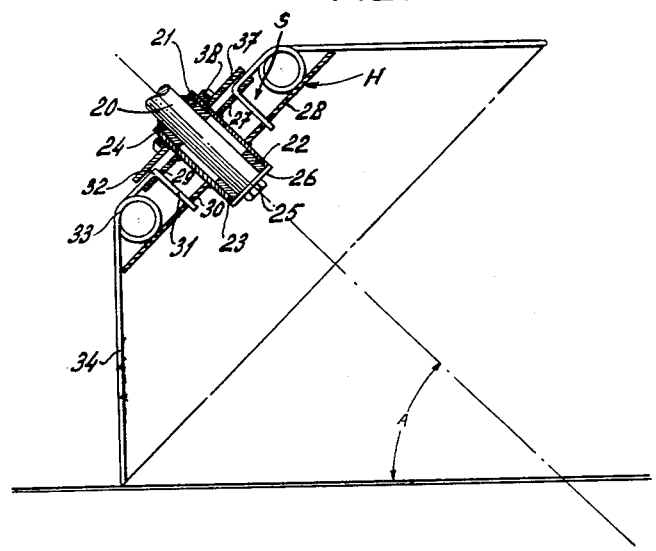
Figure 5:
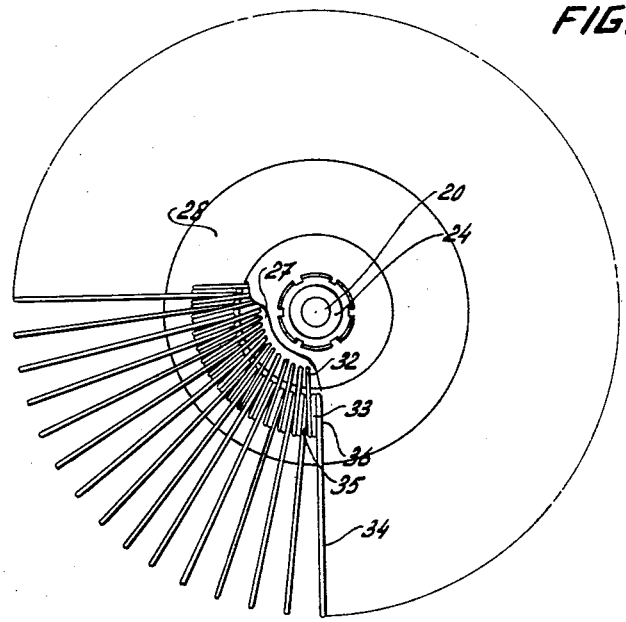

Further features and details of the invention will be hereinafter more fully described with reference to the accompanying drawing in which three preferred embodiments of the invention have been illustrated by way of example and in which:

FIG. 1 shows a rear elevation of a rake wheel according to the invention, certain parts being omitted for purposes of clarity, FIG. 2 represents a horizontal sectional view through said rake wheel according to line II—II in FIG. 1, FIG. 3 shows in enlarged scale a part of a section of the hub according to line III—III in FIG. 2, FIG. 4 shows an axial sectional view through a rake or cultivator wheel according to a further embodiment of the invention, FIG. 5 represents a top view of the wheel of FIG. 4 in axial direction and with certain parts omitted, FIG. 6 shows another rake wheel or cultivator wheel according to the invention seen in axial direction and with certain parts omitted, FIG. 7 represents a sectional view through the shaft of the wheel according to FIG. 6.

The rake wheel shown in FIGS. 1-3 has a hub 1 comprising a bushing 2 and a disc 3 mounted thereon. The bushing 2 is a journal for a shaft (not shown), on which journal the raking member is rotatably supported. The disc 3 is provided with a number of holes 4 in which by welding, for example, ten short pins 5 are mounted. A circular disc 6 having the same outer diameter as the disc 3 is positioned toward the foremost end 7 of the bushing 2, which foremost end is provided with a screw thread on which a nut 8 is screwed in order to move the disc 6 toward the disc 3. The V-shaped bent ends 9 (see FIG. 3) of forty spokes 10, which are made of steel wire and of which only a few are shown in FIGS. 1, 2 and 3 are located between the discs 6 and 3. The spokes 10 pass through openings 11 in a rim 12 and extend outside said rim with a change of direction so as to constitute supporting members 13 for tines 14. Each tine 14, the associated supporting member 13 and spoke 10 having a V-shaped end 9 are bent from a single piece of wire. Each V-shaped end 9 accommodates one adjacent V-shaped end, the insertion of one end in the other being limited by their respective surfaces coming into contact at 15 and 16. Moreover, the spacing between the discs 3 and 6 is such that the extremities 9 cannot overlap and thus are rigidly positioned. The pins 5 are located in spaces existing between selected ones of adjacent ends 9 and prevent all of the ends 9 from moving in a radially outwards direction.

To prevent rattling, the construction is preferably such that all ends 9 are clamped between the plates 3 and 6. This insures that the spokes 10 are rather firmly held in position. In addition to the simplified mounting and dismantling provided by the invention, a further advantage is that all of the steel wires can have exactly the same shape which facilitates manufacture.

The rake wheel or cultivator wheel shown in FIGS. 4 and 5 is preferably attached to an axle which during operation makes an angle A of 45° with horizontal plane, as does the axle 20 in FIG. 4. If the device is to constitute a cultivator wheel, the parts are made sufficiently rigid so as to be able to penetrate the ground. A bushing 23 provided with bearings 21 and 22 is rotatably mounted on the axle 20 and is enclosed in axial direction between a ring 24 which is fixed on the axle 20, and a plate 26 attached releasably by means of a bolt 25 against one end of the axle 20.

A disc 27 having a small diameter and a disc 28 having a longer diameter are fixedly mounted in spaced relation on the bushing 23 to constitute a hub H and are perpendicular to the longitudinal or axial direction of said bushing 23. The discs or axially spaced members 27 and 28 are provided with corresponding perforations such as perforations 29 and 30 and define an axial space S.

An end 31 of a steel wire is formed by a right angle bend 32 and is inserted through two corresponding perforations such as perforations 29 and 30. At least two complete turns 33 are formed in said steel wire close to bend 32 so that a long free end or elongated member 34 projects at angle 45° with regard to the longitudinal direction of the axle 20.

Constructionwise, each tine may be regarded as including a terminal portion sandwiched between the parallel surfaces of discs 27 and 37, these surfaces being perpendicular to the axis of rotation of the wheel, and as further including finger-like extremities or ends 34 discussed hereinunder. Each tine further includes spring-like members including helical coils 33, the spring-like members of adjacent tines being in laterally abutting relation with the coils in endwise engagement at some chosen distance from the axis of rotation.

The ends 34 define a conical surface within which lies the disc 28. The turns or wire portions 33 preferably abut the disc 28 near the circumference thereof. The windings 33 are positioned in radial planes extending through the axle 20. The end surfaces 35 and 36 of each group of windings 33 abut an end surface of the group of windings of an adjacent steel wire.

With all steel wires positioned, a rotation of all of the wires about ends 31 is prevented. In order to prevent the ends 31 from leaving the apertures 29 and 30, an annular disc 37 is secured on bushing 22 by means of a nut 38 threadably engaged on the upper end of the bushing 22. This provides means for preventing radial displacement of members 34.

In this latter embodiment, the mounting and dismantling of the tines are also very simple, and all of the tines can have exactly the same shape. The free ends 34 rest against the disc 28, due to which the free ends 34 always extend along a conical surface and retain their shapes efficiently.

The wheel shown in FIGS. 6 and 7 comprises a bushing 40 provided internally with two bearings 41 and 42 and supporting at one end a flat, round, fixedly attached disc 43. The other end of bushing 40 is provided with a screw thread 44 on which a nut 45 can be threaded. Below the nut is a short tube 46 which is fixedly connected to a flat round disc 47 having a considerably smaller diameter than the disc 43. The portions described cooperatively constitute a hub 48 which is freely rotatable about an axle 49. The hub 48 is prevented from sliding along the axle 49, on one side, by means of a flange 50 which is fixedly attached to the axle 49 and, on the other side, by means of a plate 51 which is mounted releasably against an end of the axle 49 by means of a bolt 52. In working position, the axle 49 preferably makes an angle of approximately 45° with the ground.

The bent or curved ends 53 of a number of steel wires 54 are clamped between the discs 43 and 47. In the present case in which the discs 43 and 47 are flat, the ends are shaped as parts of an involute of a circle. The bent ends 53 are all similar and can fit in mating engagement with the adjacent ends. Straight end zones 55 extending to the edge of the disc 43 are integral with the bent ends 53. At position 56, the wire makes an acute angle with a connected portion 57 which itself makes an angle of approximately 45° with the disc 43 and which portion 57 is bent backwards toward the axle at a small angle to a plane comprising the portion 55 and parallel to the axle 49. Each portion 57 is connected with a straight end portion 59 connected at an acute angle at position 58 and lying approximately in a radial plane comprising the axle 49 and the associated end 53, said end portion 59 making an angle of 45° with the axle 49. Said end portions 59 constitute the tines of the wheel and support one another at positions 58. The portions 55 and 57 enable the portions 59 to deviate resiliently about a position of equilibrium (which is the illustrated position), while the portions 58 are substantially immobile by reason of their mutual support.

What we claim is:
1. A wheel for agricultural purposes comprising hub means having an axis of rotation and including members having spaced and parallel substantially flat surfaces perpendicular to said axis, and tines coupled to said hub means, said tines including terminal portions sandwiched between said surfaces whereby axial displacement of said terminal portions is prevented, said tines also including finger-like extremities, and spring-like members connecting said extremities to said terminal portions, said spring-like members being in laterally abutting relationship at a determinable radial distance from said axis whereby angular displacement of the tines is prevented.

2. A wheel as claimed in claim 1, wherein said spring-like members are helical coils in endwise engagement.

References Cited in the file of this patent
UNITED STATES PATENTS

| | | |
|---|---|---|
| 31,865 | Brainerd et al. | Apr. 2, 1861 |
| 1,244,982 | Horst | Oct. 30, 1917 |
| 1,388,953 | Knight | Aug. 30, 1921 |
| 1,659,674 | Turner | Feb. 21, 1928 |
| 1,737,179 | Seitz | Nov. 26, 1929 |
| 2,028,365 | Wangelin | Jan. 21, 1936 |
| 2,070,830 | Gravely | Feb. 16, 1937 |
| 2,308,575 | Vickery | Jan. 19, 1943 |
| 2,438,707 | Kropp | Mar. 30, 1948 |
| 2,588,599 | Winter | Mar. 11, 1952 |

FOREIGN PATENTS

| | | |
|---|---|---|
| 674,797 | Great Britain | July 2, 1952 |